W. KEMP.
GAS ANALYZER.
APPLICATION FILED DEC. 13, 1918.
1,308,788.
Patented July 8, 1919.
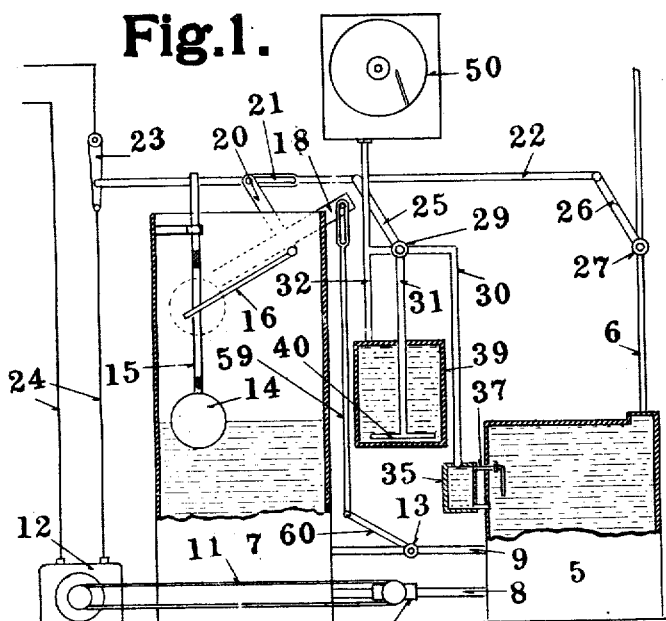
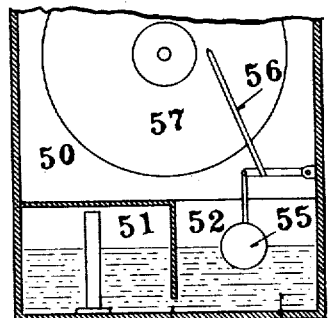
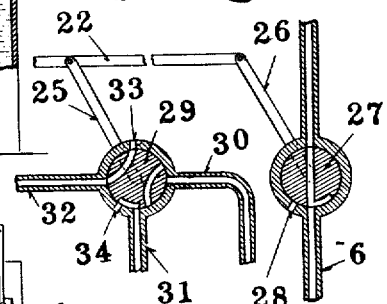
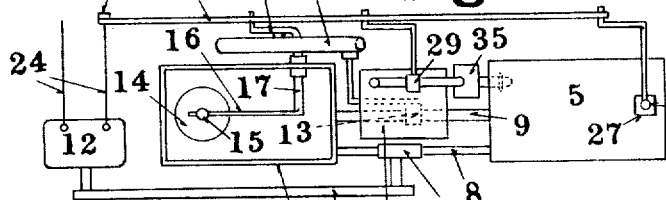
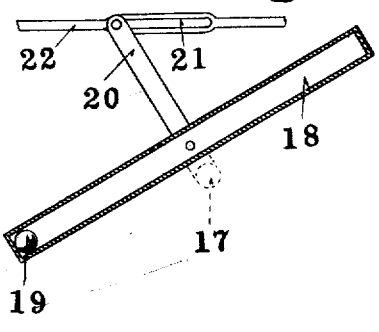
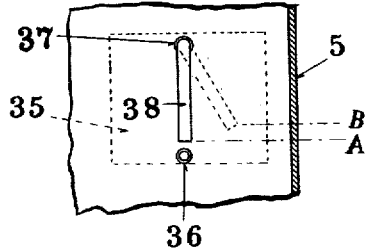
WITNESS
W. A. Alexander
INVENTOR.
Wm. Kemp.
BY
E. E. Huffman
ATTORNEY.

UNITED STATES PATENT OFFICE.

WILLIAM KEMP, OF ST. LOUIS, MISSOURI.

GAS-ANALYZER.

1,308,788. Specification of Letters Patent. Patented July 8, 1919.

Application filed December 13, 1918. Serial No. 266,539.

*To all whom it may concern:*

Be it known that I, WILLIAM KEMP, a citizen of the United States of America, residing at the city of St. Louis, State of Missouri, United States of America, have invented a certain new and useful Gas-Analyzer, of which the following is such a full, clear, and exact description as will enable any one skilled in the art to which it appertains to make and use the same, reference being had to the accompanying drawings, forming part of this specification.

My invention relates to a gas analyzer and more particularly to that form of analyzer in which the gas to be analyzed is automatically drawn into the apparatus at predetermined intervals. It is particularly adapted for use in analyzing the gases of furnaces to determine the amount of $CO_2$ contained. It may, however, be used for analyzing various other gases.

In the accompanying drawings which diagrammatically illustrate one form of gas analyzer made in accordance with my invention, Figure 1 is a front elevation partly in section. Fig. 2 is an enlarged sectional view showing the recording mechanism. Fig. 3 is a top plan view. Fig. 4 is an enlarged sectional view of the valve mechanism. Fig. 5 is an enlarged detailed view showing the gas trap; and Fig. 6 is an enlarged sectional view showing the device for securing rapid movement of the valve mechanism.

5 indicates a closed liquid container from which a pipe 6 leads to a chimney flue or other source of gas to be analyzed. Adjacent to this container 5 is an open topped container 7 communicating with the container 5 by a pair of pipes 8 and 9 respectively. Contained in the pipe 8 is a rotary pump 10 driven by means of a belt 11 from a motor 12. The object of this pump is to transfer the contents of the container 5 to the container 7 as will be hereinafter more fully set forth. The pipe 9 serves to return the contents of the container 7 to the container 5 and is preferably provided with a valve 13. Situated in the container 7 is a float 14 provided with a slotted stem 15 engaging with an arm 16 carried by a rock shaft 17 passing through the side of the container 7 and provided with a tube 18 containing a ball 19 operating as a weight to cause the rapid movement of the rock shaft after the said tube has assumed a horizontal position. The shaft 17 is also provided with an arm 20 engaging with a slot 21 in a bar 22. This bar 22 is connected at one end with a switch 23 contained in the circuit 24 supplying current to the motor 12 and is also connected with arms 25 and 26, respectively, for operating the valve mechanism. The arm 26 is connected with a valve 27 adapted to open the passage through the pipe 6 when in one position or to connect the lower part of said pipe with a vent 28 when in another position. The arm 25 is connected with a valve 29 arranged at the junction of pipes 30, 31, and 32 and is so arranged as to connect the pipe 32 with a vent 33 and to close the end of the pipe 30 and place the pipe 31 in communication with a vent 34 when in one position and when in another position to close the end of the pipe 32 and to place the pipe 30 in communication with the pipe 31. The pipe 30 extends downwardly into a trap 35 communicating with the container 5 at its lower end through a straight tube 36 and at its upper end through a tube 37 having a downturned end 38 arranged on a pivot so as to vary the position of its lower end and thus regulate the amount of gas taken from the container 5 at each operation of the apparatus. The pipe 31 extends downwardly into an absorption chamber 39 and preferably terminates in a perforated T-head 40. This absorption chamber 39 is filled with any suitable material for absorbing gas such for instance as caustic potash for absorbing the $CO_2$ when furnace gases are analyzed.

The pipe 32 is T-shaped in form and is connected at one end with the upper part of the absorption chamber 39 and at the other with a recording device 50 which may be of any suitable form, but, as shown in Fig. 2, preferably consists of a closed chamber 51, an open top chamber 52 connected with a passage 53 and containing a liquid 54 operating on a float 55 to move a recording needle 56 on the recording disk 57 of the recording device.

In order to operate the valve 13 the tube 18 is connected to a slotted bar 59 with an arm 60 connected to said valve.

The operation of my apparatus is as follows: The parts being in the position shown in Fig. 1 of the drawings, the motor 12 will operate to actuate the pump 10 and transfer the contents of the container 5 into the container 7. This will cause the gases to be analyzed to be drawn into the container 5 through the pipe 6 at the same time the contents of the trap 35 will be allowed to draw off into the container 5 through the pipe 36. As the level of the liquid rises in the container 7 the float 14 together with its slotted stem 15 will be raised until the lower end of the slot comes in contact with the arm 16 thereby operating the rock shaft 17. Owing to the slots in the bars 22 and 59 these bars will not be operated until the tube 18 has reached a horizontal position, after which the movement of the weight 19 from one end of the tube to the other will cause a rapid operation of the bars above mentioned. The rapid operation of the bars will cause the valve 13 to be opened at the same time that the switch 23 is opened to stop the motor 12 so that the contents of the container 7 will be allowed to run back into the container 5 until the liquid in the two containers reaches the same level. At the same time that the valve 13 and switch 23 are opened the valves 27 and 29 will be operated so as to place the pipe 6 in communication with the vent 28, to close the end of the pipe 32 at the valve 29 and to place the pipe 30 in communication with the pipe 31. As the liquid rises in the container 5 a certain predetermined amount of gas will be trapped off by the trap 35, the amount depending upon the angle of the pivotal pipe 38 as indicated in Fig. 5 because the passage of gas out of the pipe 38 will be prevented as soon as the lower end of said pipe is covered by the liquid. Two such positions of the pipe are indicated at A and B in Fig. 5. The amount of gas thus trapped is forced, by the further rise of the liquid, through the pipes 30 and 31 into the liquid contained in the absorption chamber 39 where the gas capable of absorption in the liquid is removed and the remaining gas is forced up through the tube 52 into the chamber 51 of the recorder 50, thus lowering the level of the liquid in this chamber and causing that in the chamber 52 to correspondingly rise and operate through the float 55 to operate the recording needle 56.

Having fully described my invention, what I claim as new and desire to secure by Letters Patent of the United States is as follows:

1. In a gas analyzer, the combination with a liquid container communicating with a source of gas to be analyzed, of a second liquid container, a pump for forcing the liquid from said first named to said second named container, and means controlled by the rise and fall of liquid in said second named container for starting and stopping said pump.

2. In a gas analyzer, the combination with a liquid container communicating with a source of gas to be analyzed, of a second liquid container, a pump for forcing the liquid from said first named to said second named container, a return passage from said second named to said first named container, a valve in said passage, and means controlled by the rise and fall of liquid in said second named container for opening and closing said valve.

3. In a gas analyzer, the combination with a liquid container communicating with a source of supply of the gas to be analyzed, of a second container, a pump for forcing the liquid from said first named to said second named container, a return passage from said second named to said first named container, a valve in said second named container, and means controlled by the rise and fall of liquid in said second named container for starting and stopping said pump and opening and closing said valve.

4. In a gas analyzer, the combination with a liquid container communicating with a source of gas to be analyzed, of a second container, a pump for forcing the liquid from said first named to said second named container, a float in said second named container, connections operated by said float for starting and stopping said pump, and means for accelerating the movement of said connections.

5. In a gas analyzer, the combination with a liquid container communicating with a source of gas to be analyzed, a second container, means for forcing the liquid from said first to said second named container, a return passage from said second named to said first named container, a valve in said passage, a float in said second named container, connections between said float and valve for opening and closing the latter, and means for accelerating the movement of said connections.

6. In a gas analyzer, the combination with a liquid container communicating with a source of gas to be analyzed, means for causing the level of liquid in said container to rise and fall, and a gas trap communicating with said container at both its upper and lower parts, the communication between the upper part of said trap and said container consisting of an adjustable pipe.

7. In a gas analyzer, the combination with a liquid container communicating with a source of gas to be analyzed, of means for causing the level of liquid in said container to rise and fall, and a gas trap communicating with said container both at its upper and lower end, the upper communication terminating in a downwardly projecting pivotal pipe.

In testimony whereof, I have hereunto set my hand and affixed my seal.

WILLIAM KEMP. [L. S.]